(12) United States Patent
Hudson et al.

(10) Patent No.: US 10,954,889 B2
(45) Date of Patent: Mar. 23, 2021

(54) THRUST REVERSER ACTUATION SYSTEM

(71) Applicant: Goodrich Actuation Systems Limited, Wolverhampton (GB)

(72) Inventors: Tim Hudson, Shropshire (GB); Nicholas Sloane, Wolverhampton (GB)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 370 days.

(21) Appl. No.: 15/836,954

(22) Filed: Dec. 11, 2017

(65) Prior Publication Data
US 2018/0163663 A1 Jun. 14, 2018

(30) Foreign Application Priority Data
Dec. 12, 2016 (EP) .................................... 16203558

(51) Int. Cl.
| F02K 1/76 | (2006.01) |
| F15B 11/22 | (2006.01) |
| F15B 13/02 | (2006.01) |
| F15B 15/18 | (2006.01) |

(52) U.S. Cl.
CPC .............. *F02K 1/763* (2013.01); *F02K 1/766* (2013.01); *F15B 11/22* (2013.01); *F15B 13/024* (2013.01); *F15B 15/18* (2013.01); *F05D 2260/406* (2013.01); *F15B 2211/20561* (2013.01); *Y02T 50/60* (2013.01)

(58) Field of Classification Search
CPC ............ F15B 2211/20561; F15B 15/18; F15B 11/22; F15B 13/024; F02K 1/763; F02K 1/70; F02K 1/72; F02K 1/60; F02K 1/605; F02K 1/62; F02K 1/625; F02K 1/766
See application file for complete search history.

(56) References Cited

U.S. PATENT DOCUMENTS

| 3,227,048 | A |   | 1/1966 | Criffield et al. |
| 4,391,409 | A | * | 7/1983 | Scholz .................... F02K 1/763 239/265.29 |
| 4,585,172 | A |   | 4/1986 | Gazzera |
| 5,996,937 | A | * | 12/1999 | Gonidec .................. F02K 1/70 239/265.17 |
| 6,625,983 | B2 |  | 9/2003 | Kawasaki |

(Continued)

FOREIGN PATENT DOCUMENTS

EP 1398493 A1 3/2004

OTHER PUBLICATIONS

Extended European Search Report for EP Application No. 16203558.8 dated May 30, 2017, 6 pages.

*Primary Examiner* — Andrew H Nguyen
(74) *Attorney, Agent, or Firm* — Cantor Colburn LLP (57) ABSTRACT

A thrust reverser actuation system for a jet propulsion engine for a vehicle, the thrust reverser actuation system comprising: a plurality of hydraulically-driven thrust reverser actuators for actuating one or more thrust reverser components of the jet propulsion engine, each actuator comprising: a hydraulic circuit; and a bi-directional electrically-driven pump configured to pump hydraulic fluid through the hydraulic circuit, wherein the hydraulic circuit and the pump are configured such that the direction of the pump dictates the direction of the actuation of the actuator.

10 Claims, 4 Drawing Sheets

(56) References Cited

U.S. PATENT DOCUMENTS

| 2006/0054406 A1* | 3/2006 | Delaloye | F01D 25/18 |
| | | | 184/6.11 |
| 2015/0152887 A1* | 6/2015 | Helbig | F15B 20/002 |
| | | | 60/327 |
| 2016/0102685 A1* | 4/2016 | Chester | F15B 11/003 |
| | | | 60/327 |

* cited by examiner

THRUST REVERSER ACTUATION SYSTEM

FOREIGN PRIORITY

This application claims priority to European Patent Application No. 16203558.8 filed Dec. 12, 2016, the entire contents of which is incorporated herein by reference.

TECHNICAL FIELD

The present invention relates to a thrust reverser actuation system for a jet propulsion engine for a vehicle, particularly for an aircraft.

BACKGROUND

There are two main types of conventional thrust reverser actuation systems.

The first type is a hydraulic system. Conventional hydraulic systems are powered by the aircraft's main hydraulic circuit. The main hydraulic circuit is at a very high pressure (e.g. 3000-5000 psi (21-35 MPa)) since it is required to power components that require significant power. However, a thrust reverser actuation system does not require such a high power/pressure to actuate thrust reverser components. Thus, using the main hydraulic circuit leads to significant power wastage. Also, the components of the thrust reverser actuation system are required to be constructed to handle said higher pressures and so are more heavy-duty than required, which leads to wasted construction costs and weight gains.

A conventional hydraulic system also comprises a complex linkage between the respective actuators in order to ensure the actuators are synchronised when they extend and retract, so that they do not exert stresses on, and hence damage, the thrust reverser component on which they act. This link can be described as a synchronisation system, and it may be hydraulic or mechanical.

A typical mechanical synchronisation system comprises a piston rod of the actuator having a threaded section and a worm wheel engaged with said thread. Thus, as the piston moves linearly, the worm wheel rotates. Different worm wheels of different actuators are mechanically linked, e.g. via a flexishaft. This ties the movement of all the actuators together. However, it adds weight to the system and can cause very high damaging loads to be transferred to the other actuators when one or more actuators jam.

An example of a prior hydraulic system is given in U.S. Pat. No. 4,585,172.

The second type is an electronic system. Conventional electronic systems are powered by electrical motors. There is no hydraulic fluid present causing the actuation. However, these systems require complex controls. For instance, complex controls are required in order to accelerate/decelerate the actuators at the end of their strokes to avoid impacts and damage to the actuators (which could occur if the piston were forced at high speed into the end of the cylinder at the end of the stroke repeatedly). Further, there are very high inertias present in the electronic system due to gearings and the electric motors having high referred inertias. Thus, in order to prevent damage to the motors and gears during jams or any other unexpected scenarios, the system must be built very strongly, which again adds weight and costs.

The inventors have identified a need to improve on the current state of the art.

SUMMARY

In a first aspect, there is disclosed a thrust reverser actuation system for a jet propulsion engine for a vehicle, the thrust reverser actuation system comprising a plurality of hydraulically-driven thrust reverser actuators for actuating one or more thrust reverser components of the jet propulsion engine, each actuator comprising: a hydraulic circuit; and a bi-directional electrically-driven pump configured to pump hydraulic fluid through the hydraulic circuit, wherein the hydraulic circuit and the pump are configured such that the direction of the pump dictates the direction of the actuation of the actuator.

The present thrust reverser actuation system is light-weight in comparison to conventional thrust reverser actuation systems. In comparison to conventional hydraulic thrust reverser actuation systems, due to the use of bi-directional electrically-driven pumps there is no requirement for a synchronisation system (as is discussed in more detail below). In comparison to conventional electrical thrust reverser actuation systems, due to the use of hydraulics there is no requirement for electrical motors and mechanical connections in the actuator system to be built very strongly. For these reasons at least, the present thrust reverser actuation system is light-weight in comparison to conventional thrust reverser actuation systems.

Further, the present thrust reverser actuation system reduces the flow demand on the vehicle's hydraulic system. In comparison to conventional hydraulic thrust reverser actuation systems, due to the use of the pumps in each actuator, the present thrust reverser actuation system does not require to be powered by the vehicle's hydraulic system.

Further, the present thrust reverser actuation system is simpler than conventional thrust reverser actuation systems. Due to each actuator having its own pump, the control of the system can be greatly simplified (indeed, the only actively-controlled component of the entire system may be the pumps, as discussed below) and there is no requirement for a complex synchronisation system between the actuators (as discussed in more detail below).

Further, the present thrust reverser actuation system reduces the danger of damage to the respective actuators. In conventional thrust reverser actuation systems, where there is a synchronisation system present synchronising the respective actuators, when one of the actuators jams the synchronisation system can transfer large loads between the respective actuators which can damage the actuators. Since, due to the use of the pumps in the present thrust reverser actuation system, there may be no need for such a synchronisation system, such loads can be avoided.

Each actuator may comprise a piston and a cylinder. Such an actuator may be referred to as a jack actuator.

The cylinder may be configured to be fixed relative to the engine and the piston may be moveable relative to the cylinder. Alternatively, the piston may be configured to be fixed relative to the engine and the cylinder may be moveable relative to the piston.

The piston may divide the cylinder into two cavities sealed from one another by the piston. Hydraulic fluid may be present in both cavities. Both cavities may be connected to the pump by the hydraulic circuit.

The piston may comprise a piston head for sealing to the internal wall of the cylinder and a rod extending from the piston head. The rod may extend through a first one of said cavities in the cylinder, and then out of the cylinder, e.g. through a sealed hole in an end of the cylinder. The rod may not extend through a second one of said cavities. The end of rod distant from the piston head may be connectable to a thrust reverser component (when the cylinder is fixed relative to the engine) or to the engine (in which case the cylinder is connectable to a thrust reverser component).

Each actuator may be actuable in a first direction between a retracted position and an extended position and in a second direction between the extended position and the retracted position. The first and second directions may be opposite to each other. In the retracted position, the thrust reverser component may be in its retracted, stowed, non-thrust-reversing position; in the extended position, the thrust reverser component may be in its extended, deployed, thrust-reversing position.

The pump may comprise two ports for hydraulic fluid. A first port may act as a low pressure inlet when the pump operates in a first direction and may act as a high pressure outlet when the pump operates in a second direction. A second port may act as a low pressure inlet when the pump operates in the second direction and may act as a high pressure outlet when the pump operates in the first direction.

The pump may operate at greater than or less than 1000, 2000, 3000, 4000 or 5000 rpm, such as 1000-5000 rpm or 2000-4000 rpm. The speed of the pump may vary depending on the electrical power provided.

Substantially all of the pump may be made from aluminium.

The vehicle may be an aircraft.

The hydraulic circuit may comprise a plurality of fluid lines for passage of hydraulic fluid, such as oil. The hydraulic circuit may comprise a first line connecting the first cavity to the first port. The hydraulic circuit may comprise a second line connecting the second cavity to the second port. The first line may connect to the first cavity toward (or substantially at) the end of the cylinder that is closest to the end of the rod that is connectable to the thrust reverser component, and the second line may connect to the first cavity toward (or substantially at) the other end of the cylinder. Alternatively, the second line may connect to the first cavity toward (or substantially at) the end of the cylinder that is closest to the end of the rod that is connectable to the thrust reverser component, and the first line may connect to the first cavity toward (or substantially at) the other end of the cylinder.

Each actuator may be operated by regenerative flow of hydraulic fluid, which is pressurised and circulated by the pump. However, as discussed below, there may be some make-up fluid needed or spill fluid excess depending on the operation of the actuator.

The pump may be housed in a housing that forms the cylinder, i.e. the pump and the cylinder may be formed as an integral unit. The pump may be located in a head of the jack actuator. The actuator may have one end through which the rod of the piston extends (i.e. through one end of the cylinder), and the pump may be located at the other end of the actuator (i.e. at the other end of the cylinder).

The first line may be in optional communication with a low pressure return line of the vehicle's hydraulic circuit. Vehicles, such as aircraft, may comprise a hydraulic circuit, comprising a high pressure line and a low pressure line, that is used to power hydraulic components in the vehicle. The first line may not be in communication with the high pressure line of the vehicle.

The second line may be in optional communication with the low pressure return line of the vehicle's hydraulic circuit. The second line may not be in communication with the high pressure line of the vehicle.

The first line may be in optional communication with the low pressure line of the vehicle's hydraulic circuit via a first pressure relief valve. The first pressure relief valve is configured to open to relieve the pressure in the first line when the pressure in the first line exceeds a threshold pressure. The threshold pressure may be greater than the pressure of the high pressure side of the pump during normal actuation (e.g. greater by at least or less than 100 psi (0.7 MPa), 200 psi (1.4 MPa), 300 psi (2.1 MPa) or 500 psi (3.4 MPa)) but may be less than the pressure that would cause damage to the actuator. This threshold pressure may be at least 1000 psi (7 MPa), 2000 psi (14 MPa), 3000 psi (21 MPa) or 4000 psi (28 MPa), and/or less than 2000 psi (14 MPa), 3000 psi (21 MPa), 4000 psi (28 MPa), or 5000 psi (34 MPa), such as 1000 psi (7 MPa)-5000 psi (34 MPa), 2000 psi (14 MPa)-4000 psi (28 MPa), or around 3000 psi (21 MPa). The threshold pressure may be 3100 psi (21.4 MPa). The first pressure relief valve may operate autonomously. The first pressure relief valve may be in the form of a spring-loaded ball valve.

The second line may be in optional communication with the low pressure line of the vehicle's hydraulic circuit via a second pressure relief valve. The second pressure relief valve is configured to open to relieve the pressure in the second line when the pressure in the second line exceeds a threshold pressure. The threshold pressure may be greater than the pressure of the high pressure side of the pump during normal actuation (e.g. greater by at least or less than around 100 psi (0.7 MPa), 200 psi (1.4 MPa), 300 psi (2.1 MPa) or 500 psi (3.4 MPa)) but may be less than the pressure that would cause damage to the actuator. This threshold pressure may be at least 1000 psi (7 MPa), 2000 psi (14 MPa), 3000 psi (21 MPa) or 4000 psi (28 MPa), and/or less than 2000 psi (14 MPa), 3000 psi (21 MPa), 4000 psi (28 MPa), or 5000 psi (34 MPa), such as 1000 psi (7 MPa)-5000 psi (34 MPa), 2000 psi (14 MPa)-4000 psi (28 MPa), or around 3000 psi (21 MPa). The threshold pressure may be 3100 psi (21.4 MPa). The second pressure relief valve may operate autonomously. The second pressure relief valve may be in the form of a spring-loaded ball valve.

During normal actuation, the high pressure side of the pump may be at around less than 1000 psi (7 MPa), 2000 psi (14 MPa), 3000 psi (21 MPa), 4000 psi (28 MPa) or 5000 psi (34 MPa), and/or greater than 1000 psi (7 MPa), 2000 psi (14 MPa), 3000 psi (21 MPa), 4000 psi (28 MPa) or 5000 psi (34 MPa), such as 1000 psi (7 MPa)-5000 psi (34 MPa), 2000 psi (14 MPa)-4000 psi (28 MPa), or around 3000 psi (21 MPa). During a jam, or another unexpected event that raises pressure, the pressure may raise to pressures that could damage the actuator. The pressure relief valve(s) prevent this occurring.

The first line may be in optional communication with the low pressure line of the vehicle's hydraulic circuit via a make-up valve. The make-up valve may be a one-way valve, such as ball valve. The make-up valve may be configured to open to provide make-up fluid to the first port of the pump when the pump actuates the actuator so as to decrease the size of the first cavity and to increase the size of the second cavity. The make-up fluid may be required because when piston moves by a certain amount, the volume of hydraulic fluid produced from the first cavity and hence provided to the first port is less than the volume of hydraulic fluid required by the second cavity to expand (since the rod is present in the first cavity but not in the second cavity).

In this situation, the pressure in the first passage may be lower than the low pressure line of the vehicle's hydraulic circuit. This may allow the one-way make-up valve to open and provide fluid from the low pressure line of the vehicle's hydraulic circuit to the first line and hence the first port. This low pressure may be achieved through use of a flow restrictor as discussed below.

The second line may be in optional communication with the low pressure line of the vehicle's hydraulic circuit via a spill valve. The spill valve may be a one-way valve, such as ball valve. The spill valve may be configured to open to allow excess fluid in the second line to pass to the low pressure line of the vehicle's hydraulic circuit when the pump actuates the actuator so as to decrease the size of the first cavity and to increase the size of the second cavity. The spill fluid may be present because when piston moves by a certain amount, the volume of hydraulic fluid produced from the second cavity and hence provided to the second port is greater than the volume of hydraulic fluid required by the first cavity to expand (since the rod is present in the second cavity but not in the first cavity).

The one way spill valve may be a pressure-enabled valve. The one way spill valve may be opened by the pressure in the second line. However, the one way spill valve may additionally/alternatively be opened by pressure in the first line. There may be fluid connection between the first line and the one way spill valve that, when high pressure fluid is present in the first line, allows said high pressure fluid to open the one way spill valve. This enables the one way spill valve to be opened without the need for pressure building up in the second line.

Each actuator may comprise a speed controller. This may be present in the first line. This may be located adjacent to the location where the first line meets the first cavity. This may be located upstream of the pump and/or the make-up valve and/or the first pressure relief valve when the actuator is operating such the first cavity is decreasing in volume; and downstream of the pump and/or the make-up valve and/or the first pressure relief valve when the actuator is operating such the first cavity is increasing in volume.

The speed controller may comprise a restriction for restricting fluid flow. This may therefore act to decrease the pressure of the fluid passing through the restrictor. The speed controller may comprise a one-way valve, such as a ball valve. The restriction and the one-way valve may be located in parallel flow paths in the speed controller. The one-way valve may be arranged such that when it is open it provides relatively low resistance to fluid flow in comparison to the restriction (preferably very little resistance to fluid flow).

The restriction and the one-way valve may be arranged such that, when the first cavity is decreasing in size, the one-way valve is closed by the fluid exiting the first cavity into the first line and so the fluid exiting the first cavity passes through the restriction, which reduces its pressure. This pressure reduction may help to ensure the one-way make-up valve discussed above can open (i.e. it may help to reduce the pressure below that of the low pressure line of the vehicle's hydraulic system).

The restriction and the one-way valve may be arranged such that, when the first cavity is increasing in size, the one-way valve is opened by the fluid passing through the first line allowing the fluid to pass through the one-way valve (relatively) unrestricted, e.g. the restriction no longer acts to restrict the flow in the first line. Thus, pressure is no longer reduced by the speed controller.

Each actuator may comprise a lock. The lock may comprise a locking member that is configured to hold the piston relative to the cylinder, for instance in the retracted state. The locking member may be moveable, preferably in a radial direction (or an at least partially radial direction), relative to the cylinder. In its extended position, the locking member may extend through the cylinder wall and into the cylinder, which may prevent the piston head from passing the locking member. In its retracted position, the locking member may not extend into the cylinder, which may allow the piston head to pass the locking member.

The locking member may be shaped such that when the piston head contacts, and applies a force to, the locking member in a first direction the locking member may not be retracted by said contact and force; but when the piston head contacts, and applies a force to, the locking member in a second opposite direction the locking member may be retracted by said contact and force.

Here, the first direction may be the direction of extension of the actuator, and the second direction may be the direction of retraction of the actuator. This may allow the retracting piston to push the locking member out of the way of the piston to allow the actuator to retract without any actuation of the locking member. This may also prevent the actuator from extending without any actuation of the locking member.

For instance, the locking member may be shaped with a radially extending surface facing in the second direction (i.e. facing away from the direction of extension of the actuator), and an angled, sloping surface (i.e. intermediate the radial direction and the first direction) facing in the first direction.

The lock may comprise a locking-member actuator. This may comprise a piston and cylinder, wherein the piston is biased in the cylinder by a biasing member (such as a spring). A rod of piston may be attached to or may form the locking member. The piston may be biased such that the locking member is biased to its extended position.

The piston and cylinder may be in communication with the second fluid line. This communication may be such that when the pump raises the pressure in the second fluid line, pressurised fluid enters the cylinder from the second line and forces the piston to move against the biasing member and hence retract the locking member to its retracted unlocked position. When the pressure in the second fluid line is low, the biasing member moves the piston back to its original position and hence extends the locking member into its locking extended position.

The lock may also comprise a lever for manual actuation of the lock.

The pumps in each of the actuators may be driven by the same electric motor using a shaft. This shaft may be a flexishaft. The shaft may pass through a fluid line that also fluidly connects all the actuators to the low pressure line of the vehicle. Controlling the speed of the one motor may control all of the pumps and hence actuators simultaneously.

Alternatively, each of the actuators may comprise its own electric motor. These may all be controlled using the same control/electrical power source/electrical signal, thus also achieving simultaneous control of the pumps and hence actuators.

Each actuator may comprise a position sensor or a position feedback system, for providing information on the extent of extension/retraction of the actuator. This may be in the form of a transducer, such as an invariable differential transducer. In conventional actuators, the thread and worm wheel are used to determine the position of the actuator. Since the present system may not have such a thread and worm wheel, the system can instead use a transducer.

Each actuator may be substantially identical to each other.

The system may comprise or consist of two actuators connectable to the same thrust reverser component. The system may comprise or consist of three actuators connectable to the same thrust reverser component. The system may comprise or consist of four actuators, two connectable to one thrust reverse component and two connectable to another thrust reverser component. The system may comprise or consist of six actuators, three connectable to one thrust reverse component and three connectable to another thrust reverser component.

The stroke length of the actuators may be at least 100 mm, or 500 mm or 1000 mm, the stroke length may be less than 2000 mm, or 1000 mm or 500 mm, the stroke length may be between 100-2000 mm or 500-1000 mm. The stroke length of each of the actuators (e.g. the distance the piston moves between the fully retracted and fully extended positions in the cylinder, or vice versa) may be identical to each other.

The actuators may be configured such that the stroke time of the actuators may be at least 1 s, 2 s or 5 s, the stroke time may be less than 10 s, 5 s or 2 s, the stroke time may be between 1-10 s or 2-5 s. The stroke time of each of the actuators (e.g. the time it takes the piston to move between the fully retracted and fully extended positions in the cylinder, or vice versa) may be substantially identical to each other, although there may be some error or difference in stroke time and length, as discussed below.

The bi-directional pump is a pump that has at least two directions, possibly only two directions. In the present actuators, as discussed above, the bi-directional pump may have two ports. A first port may act as a low pressure inlet for hydraulic fluid when the bi-directional pump operates in a first direction and a high pressure outlet for hydraulic fluid when the bi-directional pump operates in a second direction. A second port may act as a high pressure outlet for hydraulic fluid when the bi-directional pump operates in the first direction and a low pressure inlet for hydraulic fluid when the bi-directional pump operates in the second direction.

As discussed above, the pumps are electrically driven. This may be a direct electrical drive, such as an integral electric motor as part of each pump. However, it may be an indirect electrical drive, such as via a mechanical link (like the flexishaft mentioned above) to an electric motor.

The bi-directional electrically driven pumps are used as they can deliver a well-defined amount of fluid for every rotation, or for every unit of power delivered to the pumps. This allows the current thrust reverser actuation system to be synchronised only by virtue of the pump control without the need for a complex hydraulic or mechanical synchronising link between the respective actuators.

The bi-directional electrically driven pumps may each be a gear pump.

Each bi-directional pump may be substantially identical to each other.

When each pump pumps hydraulic fluid through the hydraulic circuit, the respective actuator may be actuated (e.g. extended or retracted, depending on the direction of the pump).

The plurality of actuators may be synchronised with one another by virtue of the fluid pumped by the respective pumps. As mentioned above, they be synchronised only by virtue of the fluid pumped by the respective pumps. When there is a single motor driving multiple pumps via a mechanical link, the pumps may be synchronised by virtue of being driven by the same motor. When there are multiple motors driving respective pumps in respective actuators, the pumps may be synchronised together by being provided with the same electric control signal/power supply.

Due to this simple synchronisation, the present system is much simpler and more light weight than previous systems.

Whilst there is an aim to have very little performance difference between the respective pumps and/or actuators, there may (or may not) be some performance differences between the respective pumps and/or actuators. Thus, even if they are synchronised by virtue of the same input energy, the actuators may be actuated at slightly varying speeds. Thus, the stroke times of the actuators may slightly vary.

In a typical hydraulic thrust reverser actuation system (i.e. one run from an aircraft's hydraulic circuit), such stroke variation is avoided by having a complex mechanical synchronisation the respective actuators. However, in the present system there may be no such synchronisation system. Rather, the system may rely on the similar and reliable performance characteristics of the respective pumps to actuate the actuators simultaneously and similarly. Small deviations in stroke time are acceptable under the tolerance of a typical thrust reverser component. Any small deviations in stroke time (such as less than 0.5 s, 0.2 s or 0.1 s) are made up for when the respective actuators reach the end of their stroke (i.e. any actuators that are behind simply catch up with any actuators that are ahead at the end of the stroke, i.e. at the end of the stroke the operation of the actuators is effectively "refreshed"—there is no lingering effect of a previous stroke error on the next stroke). Errors or irregularities or differences in stroke time therefore do not build up over time, and the system can therefore handle any small stroke errors or irregularities or differences that may occur.

Stated another way, when the actuators are fully retracted or extended, the actuators may re-sync with each other ahead of the reverse motion being performed by the pump being operated in the opposite direction. This re-sync may occur due to the simple hydraulic circuit and piston-cylinder arrangement discussed above. There is therefore no need for a more complex synchronisation system as used in the prior art.

Thus, there may be no hydraulic synchronising connection between the respective actuators (e.g. the pistons and/or cylinders of the respective actuators) for synchronising the actuators (e.g. the pistons and/or cylinders of the respective actuators) with one another. Rather, the only hydraulic connection between the respective actuators may be the connection to the low pressure hydraulic line (as discussed above), which may be via the make-up valve, the spill valve, and/or the pressure relief valves (as discussed above), and/or any number of intervening hydraulic lines that merely provide a flow path between the hydraulic circuit of the actuators to the low pressure hydraulic line of the vehicle. This hydraulic connection does not function to synchronise the motion of one actuator with the others; rather, the only synchronisation between the present actuators may be the control of the respective pumps.

Further, there may be no mechanical synchronising connection between the respective actuators (e.g. the pistons and/or cylinders of the respective actuators) for synchronising the actuators (e.g. the pistons and/or cylinders of the respective actuators) with one another. Rather, the only mechanical connection between the respective actuators may be the connection of the respective pumps to the same motor, or where each pump has its own motor there may be no mechanical connection between the respective actuators (apart from fact that the actuators may be connected to the same thrust reverser component and engine (as discussed above)). The mechanical connection between the respective pumps drives the actuators in a synchronised manner, however it does not act to synchronise the actuators if there is an error or difference in performance between the actuators, which is the whole purpose of a synchronisation system. The mechanical connection provided by the thrust reverser component may provide some synchronisation function, but the entire purpose of a synchronisation system (as discussed herein) is to prevent stresses on the thrust reverser component that would be caused by the thrust reverser component acting to synchronise the actuators (i.e. a conventional thrust reverser actuation system is mechanically tied together by the thrust reverser component but also has a synchronisation system to prevent stresses in the thrust reverser component caused by differences in the actuators). Thus, the mechanical link provided by the thrust reverser component is not a synchronisation system.

The actuators may be moveable (extendable/retractable) by hand (e.g. during maintenance) by simply pushing and pulling the piston. This may be the case due to the simple hydraulic circuit of the present actuator, due to the fact there is no additional synchronising link between the actuators, and because there is no high pressure fluid when the pumps are not operating. This is not the case in conventional systems as the synchronising links and/or the electronic motors provide great inertia against linear movement of the actuators by hand, even when the system is switched off. In order to move these systems by hand it is required to provide a hand-winding apparatus to wind the synchronisation system and hence move the actuators. This adds further complexity. In the present system, the only inertia to overcome is that of the piston/cylinder, the simple hydraulic circuit and the pump. Due to the simplicity of the system, these can be overcome easily by hand by simply pushing and pulling the piston rod.

As discussed above, each hydraulic circuit may be arranged to be connected to a low-pressure line of a hydraulic circuit of the vehicle such that, when make-up hydraulic fluid is required, make-up hydraulic fluid can be provided to each actuator from the low-pressure line of the vehicle and, when hydraulic fluid is required to be spilled, spill hydraulic fluid can be delivered to the low-pressure line of the vehicle.

As has been discussed above, the hydraulic circuit may be arranged not to be connected to a high-pressure line of a hydraulic circuit of the vehicle. Indeed, the actuators and/or the entire thrust reverser actuation system may have no hydraulic communication with the high-pressure line of a hydraulic circuit of the vehicle; rather, the only hydraulic communication with the hydraulic circuit of the vehicle may be with the vehicle's low pressure line.

This is in contrast to existing hydraulic thrust reverser actuation system's which are powered by the vehicle's high pressure hydraulic line. Not being powered by the vehicle's high pressure hydraulic circuit allows the present system not to be a burden on the vehicle's hydraulic circuit, which can improve the overall efficiency of the system and the vehicle. Further, the vehicle's high pressure hydraulic line may be at a higher pressure than is required by the thrust reverser actuation system, which means the conventional thrust reverser actuation system may need to be built to handle greater pressures than necessary, which can add unnecessary weight, and may need to reduce the pressure, which can increase energy losses in the system. The present system can avoid these issues.

As has been discussed above, the hydraulic circuit of each actuator may comprise a one or more pressure relief valves, said one or more pressure relief valves being configured to limit pressure in the respective hydraulic circuits to prevent damage of the respective actuators.

As mentioned above, pressure could increase in the hydraulic circuit to levels that would damage the actuator if, for instance, the actuator jams, i.e. the piston and cylinder jams, and the pump continues to operate. The pressure relief valve(s) may prevent pressure increasing to levels that would damage the actuator. There may be (possibly only) one pressure relief valve for relieving the pressure when the pump acts in the first direction (e.g. to extend the actuator) and there may be (possibly only) one pressure relief valve for relief valve for relieving the pressure when the pump acts in the second direction (e.g. to retract the actuator).

As has been discussed above, each hydraulic circuit may be arranged to be connected to a low-pressure line of a hydraulic circuit of the vehicle, and the pressure relief valves may be arranged such that when they are open they allow the hydraulic fluid in the actuator to be delivered to the low-pressure line.

As has been discussed above, each actuator may comprise a lock for locking the actuator in position, wherein said lock is connected to the hydraulic circuit and is arranged to be unlocked by the fluid when the pump pressurises the fluid. The lock may be arranged to be unlocked only when the pump operates in the first direction (e.g. the direction which would act to extend the actuator, i.e. the first direction), and may not be unlocked when the pump operates in the second direction.

The pump may be the only actively-controlled component in each of the actuators, or indeed the entire actuation system. The control of the present thrust reverser actuation system may therefore be greatly simplified in comparison to existing systems. Existing electronic systems require complex electronic controls to adequately control the actuation. Existing hydraulic systems require complex controls to adequately control the actuation. The present system does not require such complex controls due to the use of the bi-directional electronic pump. Since a bi-directional electronic pump (such as a gear pump) can deliver a reliable amount of fluid/pressure change given a certain input then all that may be required to control the actuators is the power input into the pumps. The locking mechanism discussed herein may also be actively controlled, but this is not part of the actuation system as defined herein.

As discussed above, the stroke of each of the actuators may be the same.

As discussed above, the thrust reverser actuation system may comprise an electrical motor, wherein the motor drives the pumps of the plurality of actuators. There may be only one electrical motor, or there may be one electrical motor for every two actuators, or one electrical motor for every three actuators. This may be linked to the pumps mechanically, e.g. via a drive shaft such as a flexishaft. The mechanical link may pass through a hydraulic line that connects the hydraulic system of each actuator to the low pressure line of the vehicle's hydraulic circuit (i.e. said line may be full of hydraulic fluid at said low pressure).

Alternatively, as discussed above the thrust reverser actuation system may comprise a plurality of motors, wherein each motor drives a respective one of the pumps of plurality of actuators.

The motors may be substantially identical to each other. The pumps may be substantially identical to each other. The motors may operate at the same speed as each other. The pumps may operate at the same speed as each other.

In a second aspect, there is provided a thrust reverser system for a jet propulsion engine for a vehicle comprising: at least one thrust reverser component; and the thrust reverser actuation system as discussed in the first aspect arranged to actuate the at least one thrust reverser component.

As intended herein, a thrust reverser component is a section of a jet propulsion engine's nacelle or cowling or housing. A thrust reverser component is typically located toward the rear of the engine. A thrust reverser component is positioned and arranged such that when it is retracted, exhaust from the engine is allowed to exit the engine in a rearward direction and, when it is extended, at least some of the exhaust from the engine is deflected by the thrust reverser component such that the exhaust has at least a component in the forward direction of the vehicle.

There may be two thrust reverser components, possibly only two.

Each thrust reverser may have at least or only one, two or three actuators.

With regard to the actuators, the cylinders may be fixed relative to engine and the pistons (e.g. the end of the piston rod that is distant from the piston head and protrudes through the end of the cylinder) may be attached to the thrust reverser component(s). Alternatively, the cylinders may be fixed relative to thrust reverser component(s) and the pistons (e.g. the end of the piston rod that is distant from the piston head and protrudes through the end of the cylinder) may be attached to the engine.

The thrust reverser component(s) may be deployed (such that it/they act to reverse the thrust) when the actuators are extended and may be retracted (such that it/they do not act to reverse the thrust) when the actuators are retracted. Alternatively, the thrust reverser component(s) may be deployed (such that it/they act to reverse the thrust) when the actuators are retracted and may be retracted (such that it/they do not act to reverse the thrust) when the actuators are extended.

In a third aspect, there is provided a jet propulsion engine for a vehicle comprising the thrust reverser system of the second aspect.

The engine may comprise the vehicle's hydraulic circuit discussed above. The hydraulic circuit may comprise a high pressure line and a low pressure line. The circuit may be used to power hydraulic components in the vehicle/engine.

In a fourth aspect, there is provided a vehicle comprising the jet propulsion engine of the third aspect. The vehicle may comprise the vehicle's hydraulic circuit discussed above.

BRIEF DESCRIPTION OF THE DRAWINGS

Certain preferred embodiments will now be described by way of example only and with reference to the accompanying drawings, in which.

DETAILED DESCRIPTION

Figure 1:
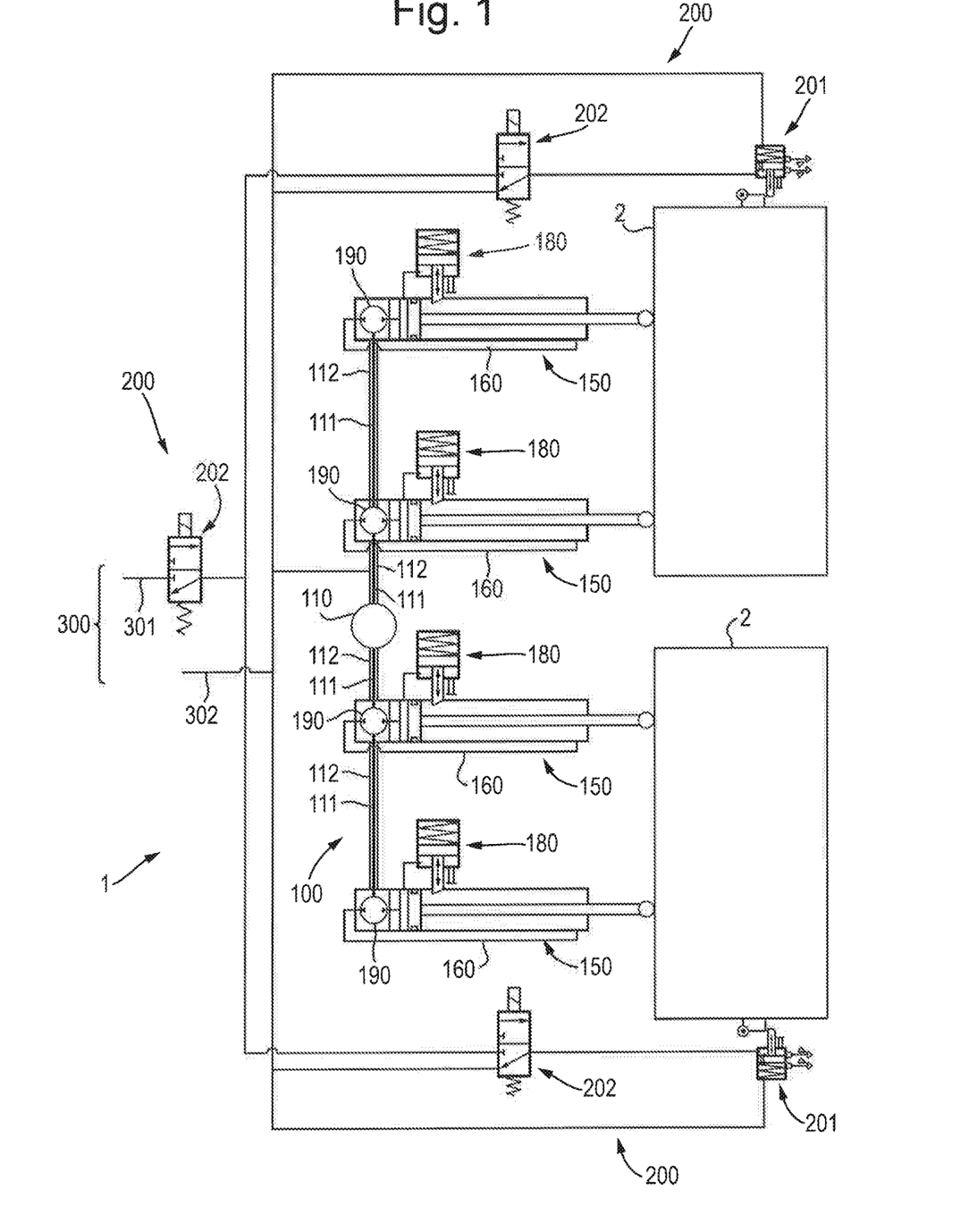
FIG. 1 shows a thrust reverser system according to an embodiment of the present invention.

With regard to FIG. 1, shown is a schematic view of a thrust reverser system 1 for a jet propulsion engine according to an embodiment of the present invention. The thrust reverser system 1 comprises two thrust reverser components 2 and a thrust reverser actuation system 100 arranged to actuate the thrust reverser components 2.

Each thrust reverser 2 is actuated by two actuators 150, which are discussed in more detail below. The actuators 150 are part of the thrust reverser actuation system 100.

The thrust reverser components 2 are deployed when the actuators 150 are extended and are retracted when the actuators 150 are retracted.

The thrust reverser components 2 are releasably held in the retracted position by a locking system 200. The locking system 200 may be communication with an aircraft's main hydraulic circuit 300, in particular both the high pressure supply line 301 and the low pressure return line 302.

The locking system 200 comprises a locking unit 201 per thrust reverser component 2 and electrically-controlled switches 202. In the locking position, the locking units 201 are only in communication with the return line 302 (as shown in FIG. 1). However, the switches 202 can be switched to positions such that high pressure fluid in the supply line 301 acts to actuate the locking units 201 and hence release the components 2. When this occurs, the hydraulic fluid passing through the locking units 201 can be output into the return line 302.

With regard to the thrust reverser actuation system 100, each actuator comprises a hydraulic circuit 160 and a bi-directional electrically-driven pump 190 configured to pump hydraulic fluid through the hydraulic circuit 160. The hydraulic circuit 160 and the pump 190 are configured such that the direction of the pump 160 dictates the direction of the actuation of the actuator 150.

Figure 3:
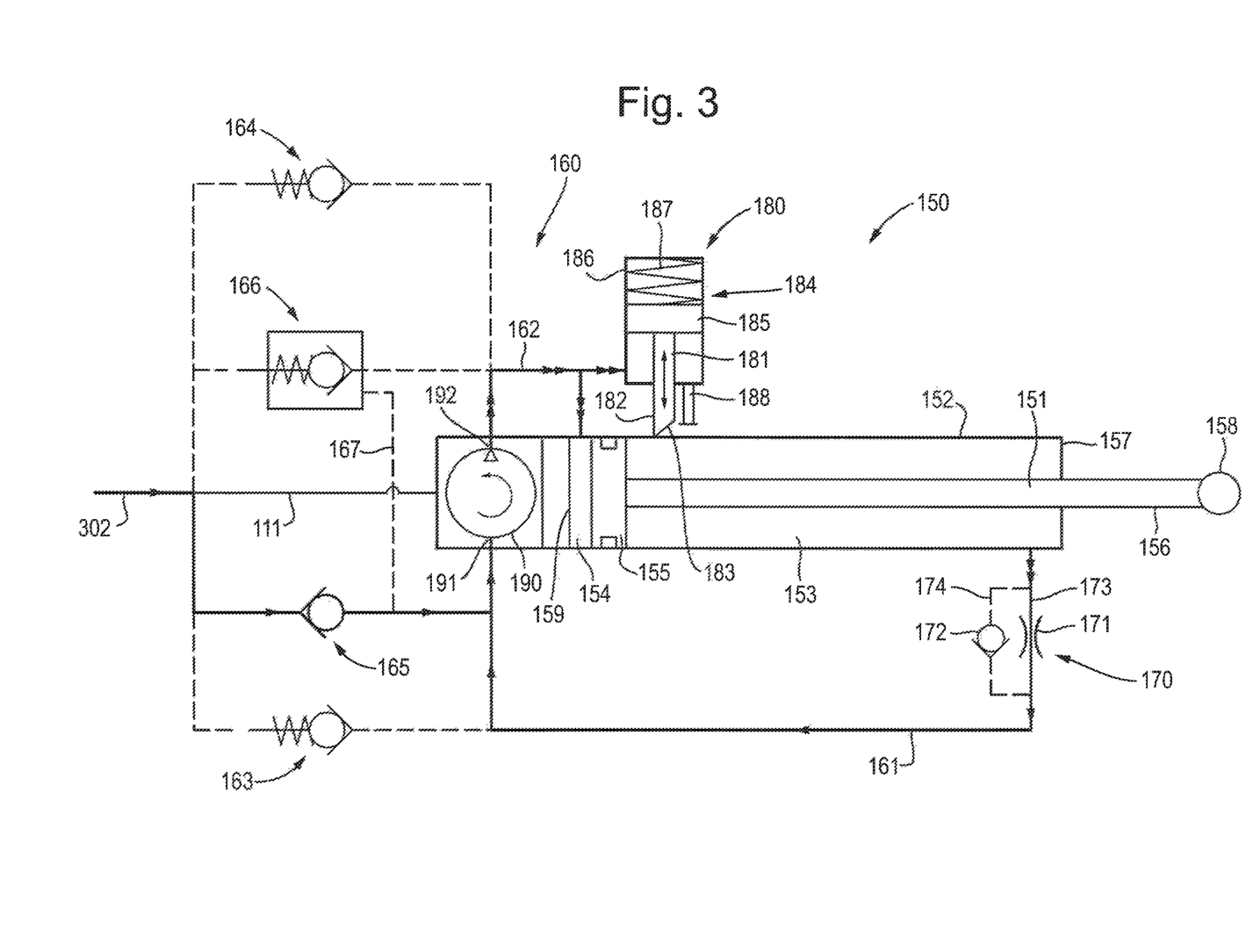
FIG. 3 shows a schematic view of an exemplary actuator operating in a first direction according to an embodiment of the present invention.
Figure 4:
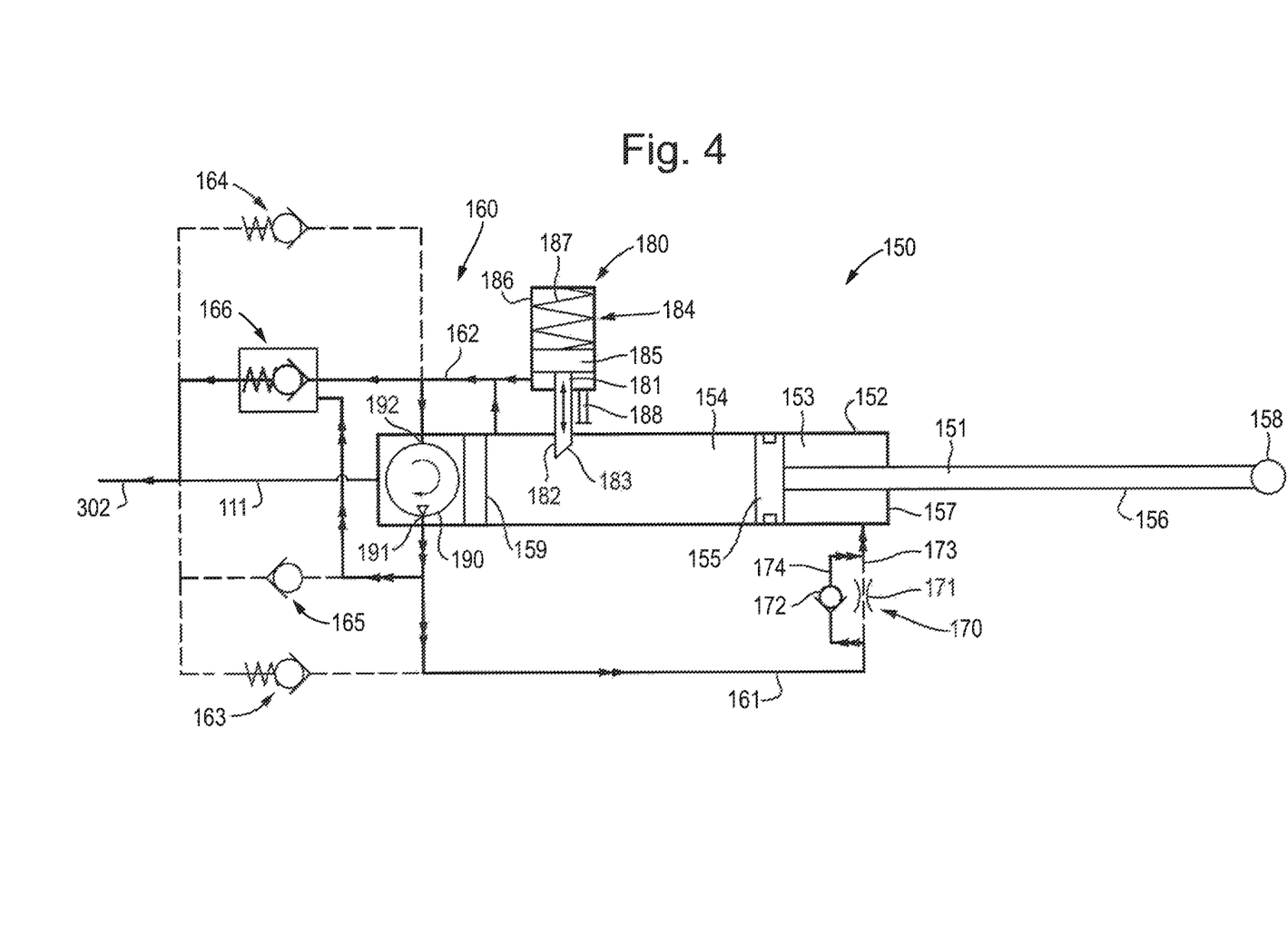
FIG. 4 shows the actuator of FIG. 3 operating a second direction.

With regard to FIGS. 3 and 4, each actuator 150 may comprise a piston 151 and a cylinder 152. The cylinder 152 is configured to be fixed relative to the engine and the piston 151 is moveable relative to the cylinder 152 and the engine. The piston 151 divides the cylinder 152 into two cavities 153, 154 sealed from one another by the piston 151. Hydraulic fluid is present in both cavities 153, 154. Both cavities 153, 154 are connected to the pump 190 by the hydraulic circuit 160.

Figure 2:
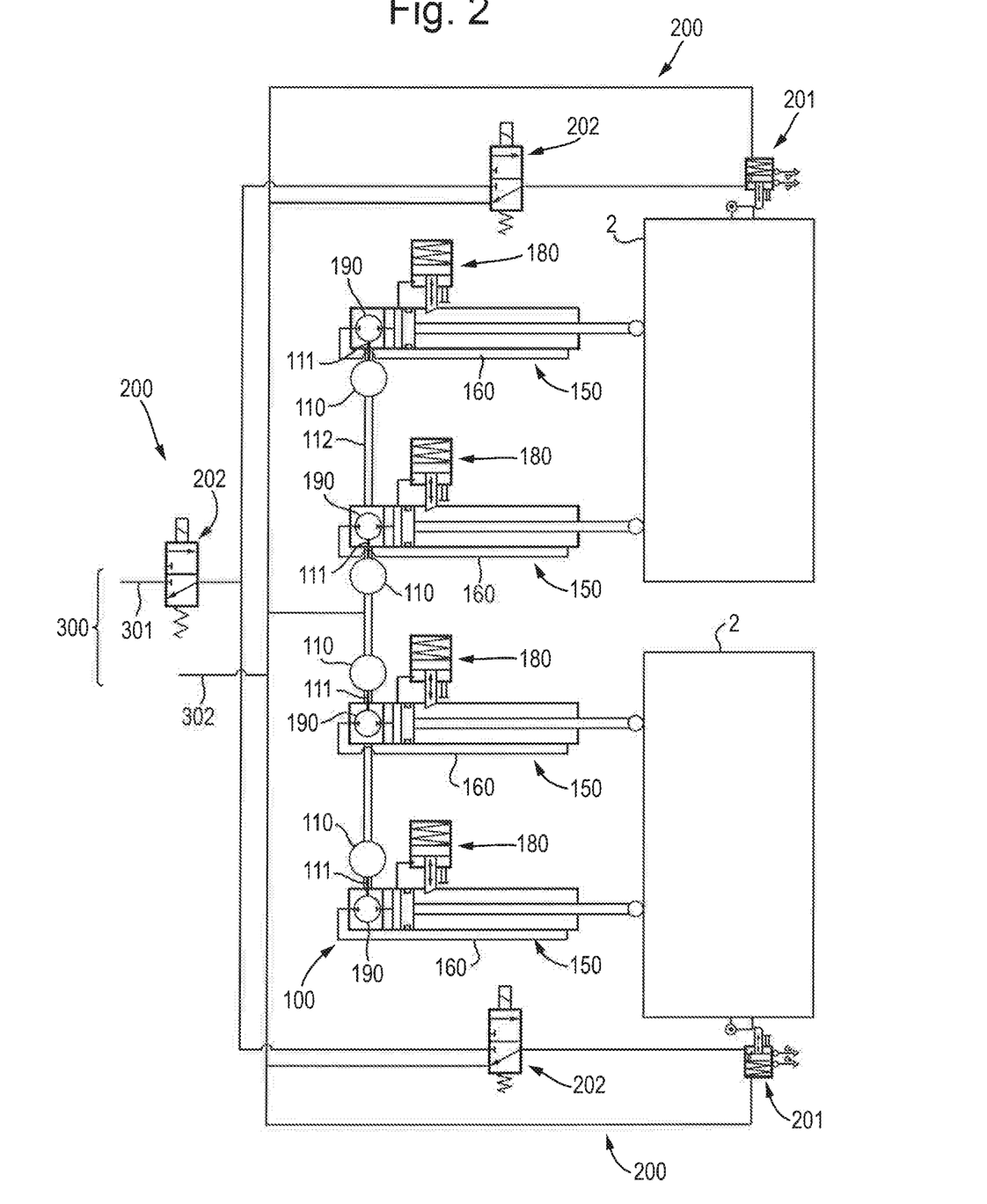
FIG. 2 shows another thrust reverser system according to an embodiment of the present invention.

The piston 151 comprises a piston head 155 for sealing to the internal wall of the cylinder 152 and a rod 156 extending from the piston head 155. The rod 156 extends through a first one of said cavities 153 in the cylinder, and then out of the cylinder through a sealed hole in an end 157 of the cylinder. The rod 156 does not extend through a second one of said cavities 154. The end 158 of rod 156 distant from the piston head 155 is connected to a thrust reverser component 2 as shown in FIGS. 1 and 2.

Each actuator 150 is actuable in a first direction between a retracted position and an extended position. This direction of actuation is shown in FIG. 3. Each actuator 150 is actuable in a second direction between the extended position and the retracted position. This direction of actuation is shown in FIG. 4.

The pump 190 comprises two ports 191, 192 for hydraulic fluid. A first port 191 acts as a low pressure inlet when the pump 190 operates in the first direction (as shown in FIG. 3) and acts as a high pressure outlet when the pump 190 operates in a second direction (as shown in FIG. 4). A second port 192 acts as a low pressure inlet when the pump 190 operates in the second direction (as shown in FIG. 4) and acts as a high pressure outlet when the pump 190 operates in the first direction (as shown in FIG. 3).

In FIGS. 3 and 4 high pressure fluid flow is shown with a double arrow, and low pressure fluid flow is shown with a single arrow. Where there is no flow (e.g. since the shown fluid path is closed), this is shown with a dotted line.

The hydraulic circuit 160 comprises a plurality of fluid lines 161, 162 for passage of hydraulic fluid. The hydraulic circuit 160 comprises a first line 161 connecting the first cavity 153 to the first port 191. The hydraulic circuit 160 comprises a second line 162 connecting the second cavity 154 to the second port 192. The first line 161 is connected to the first cavity 153 toward the end 157 of the cylinder 152 that is nearest to the end 158 of the rod to which the component 2 is attached. The second line 154 connects to the second cavity toward the other end 159 of the cylinder.

Each actuator 150 is operated by regenerative flow of hydraulic fluid, which is pressurised and circulated by the pump 190. However, as discussed below, there is some make-up fluid needed or spill fluid excess depending on the operation of the actuator 150.

The pump 190 is housed in a housing that forms the cylinder 152, i.e. the pump 190 and the cylinder 152 are formed as an integral unit. The pump 190 is located adjacent the end 159 of the cylinder opposite the end 157 through which the rod 156 passes.

The first line 161 is in optional communication with the low pressure return line 302 of the vehicle's hydraulic circuit 300. The second line 161 is also in optional communication with the low pressure return line 302 of the vehicle's hydraulic circuit 300.

The first line 161 is in optional communication with the low pressure line 302 of the vehicle's hydraulic circuit 300 via a first pressure relief valve 163. The first pressure relief valve 163 is configured to open to relieve the pressure in the first line 161 when the pressure in the first line 161 exceeds a threshold pressure. The first pressure relief valve 163 operates autonomously. The first pressure relief valve 163 is a spring-loaded ball valve.

The second line 162 is in optional communication with the low pressure line 302 of the vehicle's hydraulic circuit via a second pressure relief valve 164. The second pressure relief valve 164 is configured to open to relieve the pressure in the second line 162 when the pressure in the second line 162 exceeds a threshold pressure. The second pressure relief valve 164 operates autonomously. The second pressure relief valve 164 is a spring-loaded ball valve. During a jam, or another unexpected event that raises pressure, the pressure may raise to pressures that could damage the actuator 150. The pressure relief valves 163, 164 prevent this occurring.

The first line 161 is in optional communication with the low pressure line 302 of the vehicle's hydraulic circuit 300 via a make-up valve 165. The make-up valve 165 is a one-way valve, such as ball valve. The make-up valve 165 is configured to open to provide make-up fluid to the first port 191 of the pump 190 when the pump 190 actuates the actuator so as to decrease the size of the first cavity 153 and to increase the size of the second cavity 154 (as shown in FIG. 3). The make-up fluid is required because when piston 151 moves by a certain amount, the volume of hydraulic fluid produced from the first cavity 153 and hence provided to the first port 191 is less than the volume of hydraulic fluid required by the second cavity 154 to expand (since the rod 156 is present in the first cavity 153 but not in the second cavity 154).

In this situation, the pressure in the first passage 161 is lower than the low pressure line 302 of the vehicle's hydraulic circuit 300. This may allow the one-way make-up valve 165 to open and provide fluid from the low pressure line 302 of the vehicle's hydraulic circuit 300 to the first line 161 and hence the first port 191. This low pressure may be achieved at least in part through use of the flow restrictor 171 discussed below.

The second line 162 is in optional communication with the low pressure line 302 of the vehicle's hydraulic circuit 300 via a spill valve 166. The spill valve 166 is a one-way valve, such as ball valve. The spill valve 166 is configured to open to allow excess fluid in the second line 162 to pass to the low pressure line 302 when the pump 191 actuates the actuator 150 so as to decrease the size of the first cavity and to increase the size of the second cavity (as shown in FIG. 4). The spill fluid is present because when the piston 151 moves by a certain amount, the volume of hydraulic fluid produced from the second cavity 154 and hence provided to the second port 192 is greater than the volume of hydraulic fluid required by the first cavity 153 to expand (since the rod 156 is present in the first cavity 153 but not in the second cavity 154).

The one way spill valve 166 is a pressure-enabled valve. The one way spill valve is opened by the pressure in the first line 161. There is a fluid connection 167 between the first line 161 and the one way spill valve 166 that, when high pressure fluid is present in the first line 161, allows said high pressure fluid to open the one way spill valve 166. This enables the one way spill valve 166 to be opened without the need for pressure building up in the second line 162.

Each actuator 150 comprises a speed controller 170. This is part of the first line 161 and is located adjacent to the location where the first line 161 meets the first cavity 153, i.e. it is located upstream of the pump 191, the make-up valve 165 and the first pressure relief valve 163 when the actuator 150 is operating such the first cavity 153 is decreasing in volume; and downstream of the pump 190, the make-up valve 163 and the first pressure relief valve 163 when the actuator 150 is operating such the first cavity 153 is increasing in volume.

The speed controller 170 comprises a restriction 171 for restricting fluid flow. This acts to decrease the pressure of the fluid passing through the restriction 171. The speed controller 170 comprises a one-way valve 172, such as a ball valve. The restriction 171 and the one-way valve 172 are located in parallel flow paths 173, 174 in the speed controller 170. The one-way valve 172 is arranged such that when it is open it provides relatively low resistance to fluid flow in comparison to the restriction 171.

The restriction 171 and the one-way valve 172 are arranged such that, when the first cavity 153 is decreasing in size, the one-way valve 172 is closed by the fluid exiting the first cavity 153 into the first line 161 and so the fluid exiting the first cavity 153 passes through the restriction 172, which reduces its pressure. This pressure reduction may help to ensure the one-way make-up valve 163 discussed above can open (i.e. it may help to reduce the pressure below that of the low pressure line 302).

The restriction 171 and the one-way valve 172 are arranged such that, when the first cavity 153 is increasing in size, the one-way valve 172 is opened by the fluid passing through the first line 161 allowing the fluid to pass through the one-way valve 172 relatively unrestricted. Since the fluid can pass through the one-way valve 172, the restriction 171 no longer acts to restrict the flow in the first line 161. Thus, pressure is no longer reduced by the speed controller 170.

Each actuator 150 comprises a lock 180. The lock 180 comprises a locking member 181 that is configured to hold the piston 151 relative to the cylinder 152 in the retracted state of the actuator 150. The locking member 181 is moveable in a radial direction relative to the cylinder 152 and the piston 151. In its extended position (see FIG. 4), the locking member 181 extends through the cylinder wall and into the cylinder 152, which may prevent the piston head 155 from passing the locking member 181. In its retracted position (see FIG. 3), the locking member 181 does not extend into the cylinder 152, which allows the piston head 155 to pass the locking member 181.

The locking member 181 is shaped such that when the piston head 155 contacts, and applies a force to, the locking member 181 in a first direction the locking member is not retracted by said contact and force; but when the piston head 155 contacts, and applies a force to, the locking member 181 in a second opposite direction the locking member 181 is retracted by said contact and force.

Here, the first direction may be the direction of extension of the actuator 150, and the second direction may be the direction of retraction of the actuator 150. This allows the retracting piston 151 to push the locking member 181 out of the way of the piston 151 to allow the actuator 150 to retract without any actuation of the locking member 181. This also prevents the actuator 150 from extending without any actuation of the locking member 181.

Specifically, the locking member 181 is shaped with a radially extending surface 182 facing in the second direction (i.e. facing away from the direction of extension of the actuator), and an angled, sloping surface (i.e. intermediate the radial direction and the first direction) facing in the first direction 183.

The lock 180 comprises a locking-member actuator 184. This comprises a piston 185 and cylinder 186, wherein the piston is biased in the cylinder by a biasing member 187. A rod of piston 185 forms the locking member 181. The piston 185 is biased such that the locking member 181 is biased to its extended position.

The piston 185 and cylinder 186 are in communication with the second fluid line 162. This communication may be such that when the pump 190 raises the pressure in the second fluid line 162, pressurised fluid enters the cylinder 186 from the second line 162 and forces the piston 185 to move against the biasing member 187 and hence retract the locking member 181 to its retracted unlocked position (see FIG. 3). When the pressure in the second fluid line 162 is low (see FIG. 4), the biasing member 187 moves the piston 185 back to its original position and hence extends the locking member 181 into its locking extended position.

The lock 180 also comprises a lever 188 for manual actuation of the locking member 181.

Returning to FIG. 1, the pumps 190 in each of the actuators 150 are driven by the same electric motor 110 using one or more shafts 111. The shaft 111 passes through a fluid line 112 that also fluidly connects all the actuators 150 to the low pressure line 302 of the vehicle. Controlling the speed of the single motor 110 controls all of the pumps 190 and hence actuators 150 simultaneously. The shaft 111 may be the only mechanical connection between the respective actuators, other than the mechanical connection provided by the components 2 between the ends 158 of the piston rod 156 and the fact that the cylinders 152 are secured to the same engine. The fluid line 112 may provide the only hydraulic connection between the respective actuators.

Alternatively, referring to FIG. 2, each of the actuators 150 comprises its own electric motor 110. These motors 110 are all be controlled using the same control/electrical power source/electrical signal, thus also achieving simultaneous control of the pumps 190 and hence actuators 150. There may still be a shaft 111 between each motor 110 and the respective pump 109. These shafts 111 may also be located within the fluid line 112 that fluidly connects all the actuators 150 to the low pressure line 302 of the vehicle. In this case, the only mechanical connection between the respective actuators is provided by the components 2 between the ends 158 of the piston rod 156 and the fact that the cylinders 152 are secured to the same engine.

The invention claimed is:

1. A thrust reverser actuation system for a jet propulsion engine for a vehicle, the thrust reverser actuation system comprising:

a plurality of hydraulically-driven thrust reverser actuators for actuating one or more thrust reverser components of the jet propulsion engine, each of the actuators comprising:
a cylinder;
an actuator hydraulic circuit; and
a bi-directional electrically-driven pump configured to pump hydraulic fluid through the actuator hydraulic circuit,
wherein, for each of the actuators, the actuator hydraulic circuit and the pump are configured such that the direction of the pump dictates the direction of the actuation of the actuator,
wherein, for each of the actuators, the actuator is operated by regenerative flow of the hydraulic fluid through the actuator hydraulic circuit of the actuator which is pressurized and circulated by the pump of the actuator,
wherein each of the actuator hydraulic circuits is arranged to be connected to a low-pressure line of a vehicle hydraulic circuit of the vehicle, the vehicle hydraulic circuit of the vehicle comprising the low-pressure line and a high-pressure line that has a higher pressure than the low pressure line, such that make-up hydraulic fluid is provided to each of the actuators from the low-pressure line of the vehicle hydraulic circuit and spill hydraulic fluid is delivered to the low-pressure line of the vehicle hydraulic circuit, and
wherein each of the actuator hydraulic circuits is arranged not to be connected to the high-pressure line of the vehicle hydraulic circuit;
wherein each of the actuators comprises a lock for locking the actuator in position, wherein said lock comprises a locking member configured to extend into the cylinder and is connected to the actuator hydraulic circuit and is arranged to be unlocked by the hydraulic fluid when the pump pressurises the fluid.

2. A thrust reverser actuation system as claimed in claim 1, wherein the plurality of actuators are synchronised with one another by virtue of the hydraulic fluid pumped by the respective pumps.

3. A thrust reverser actuation system as claimed in claim 1, wherein there is no hydraulic synchronising connection between the actuators synchronising the actuators with one another.

4. A thrust reverser actuation system as claimed in claim 1, wherein there is no mechanical synchronising connection between the actuators for synchronising the actuators with one another.

5. A thrust reverser actuation system as claimed in claim 1, where each of the actuator hydraulic circuits comprises one or more pressure relief valves, said one or more pressure relief valves being configured to limit pressure in the actuator hydraulic circuits to prevent damage of the respective actuators.

6. A thrust reverser actuation system as claimed in claim 5, wherein the one or more pressure relief valves are arranged such that when they are open they allow the hydraulic fluid in the actuator hydraulic circuit to be delivered to the low-pressure line.

7. A thrust reverser actuation system as claimed in claim 1, wherein the pump is the only actively-controlled component in each of the actuators.

8. A thrust reverser actuation system as claimed in claim 1, wherein each of the actuators is substantially identical to one another.

9. A thrust reverser actuation system as claimed in claim 1, wherein the thrust reverser actuation system comprises an electrical motor, and wherein the motor drives the pumps of the plurality of actuators.

10. A thrust reverser actuation system as claimed in claim 1, wherein the thrust reverser actuation system comprises a plurality of motors, and wherein each of the motors drives a respective one of the pumps of the plurality of actuators.

* * * * *